United States Patent Office 3,158,768
Patented Nov. 24, 1964

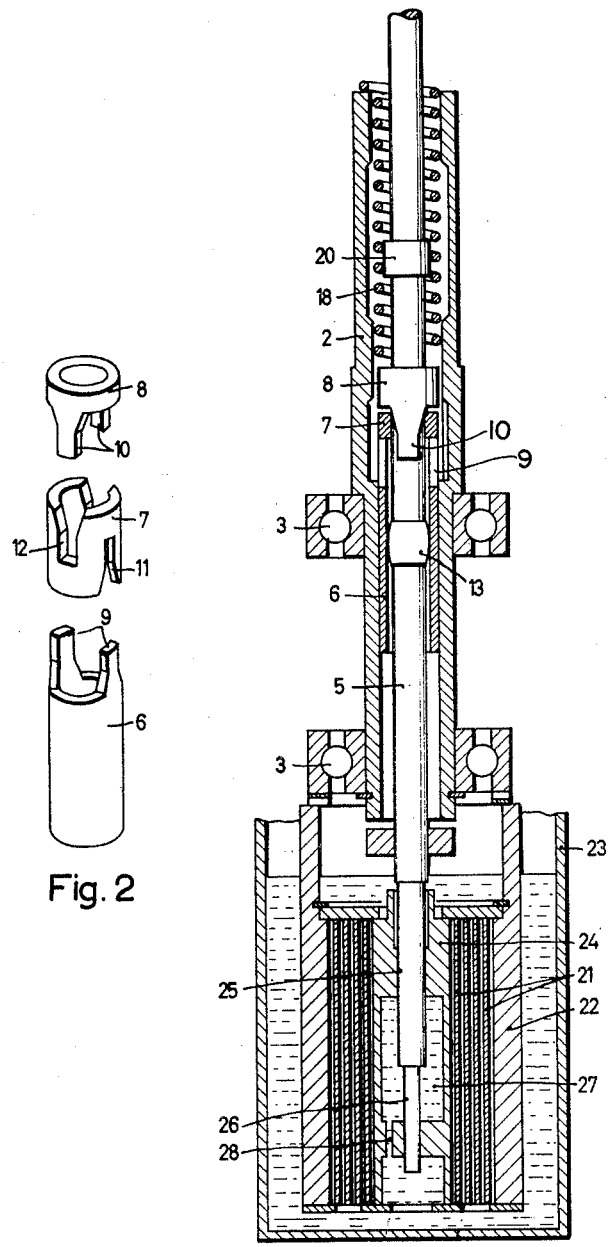

3,158,768
SPINNING-POT MOTOR
Siegfried Schönwald, Bad Neustadt an der Saale, Germany, assignor to Siemens-Schuckertwerke Aktiengesellschaft, Berlin-Siemensstadt, Germany, a corporation of Germany
Filed May 9, 1961, Ser. No. 108,833
Claims priority, application Germany, May 13, 1960, S 68,497
10 Claims. (Cl. 310—157)

My invention relates to electric spinning-pot motors for use in the production of filaments from rayon or other synthetics.

The centrifugal spinning pot for such purposes is directly mounted on the vertical shaft of an electric drive motor. Vibrations may occur due to unbalance in the spinning pot and in the spinning dough contained therein. Such vibrations must be damped for obtaining a uniform filament and for relieving the motor bearings. The damping problem becomes more aggravated with increasing speeds and diameters of the spinning-pots.

It is known to employ motors whose rotor shaft is journalled in rigid bearings and whose housing is mounted in rubber buffers with the spinning-pot mounted on an elastic shaft whose lower end is firmly inserted into a central bore of the motor shaft proper. While any occurring vibrations are damped to some extent by the rubber buffers, the known device no longer satisfies modern, more exacting requirements.

There are also known spinning-pot assemblies in which the rotor of the drive motor is oscillatingly journalled. This requires a relatively wide air gap between the stator and rotor of the motor, thus impairing the electric efficiency of the drive.

It is an object of my invention to eliminate the above-mentioned deficiencies.

To this end, and in accordance with my invention, I provide the electric motor of a spinning-pot assembly with a tubular rotor shaft which is traversed by a second shaft that carries the spinning-pot and is displaceable relative to the tubular shaft in the axial and/or radial and/or angular direction, while being torque-transmittingly connected with the tubular shaft. I furthermore provide this assembly with one or more vibration-damping devices at the lower end of the inner shaft which is remote from the spinning-pot and protrudes downwardly out of the hollow shaft. The damping device preferably consists of a frictional or hydraulic damper which dampens the oscillations transmitted from the inner shaft.

According to another feature of the invention, I provide for a resilient return of the inner shaft to a given mid-position. To this end, I equip the assembly with an elastic member that produces a centering force. It is particularly advantageous to dispose the elastic centering element between the hollow shaft and the inner shaft which both rotate at the same speed.

The foregoing and more specific objects, advantages and features of my invention, said features being set forthwith particularly in the claims annexed hereto, will be apparent from, and will be described in, the following with reference to the embodiments of spinning-pot motor assemblies according to my invention illustrated by way of example on the accompanying drawings in which:

FIG. 2 is a perspective and exploded view of the coupling device between the hollow shaft and the inner shaft of the assembly.

FIG. 3 is an axial section through part of a modified spinning-pot motor assembly.

The same reference numerals are applied in all figures to corresponding elements respectively.

Figure 1:
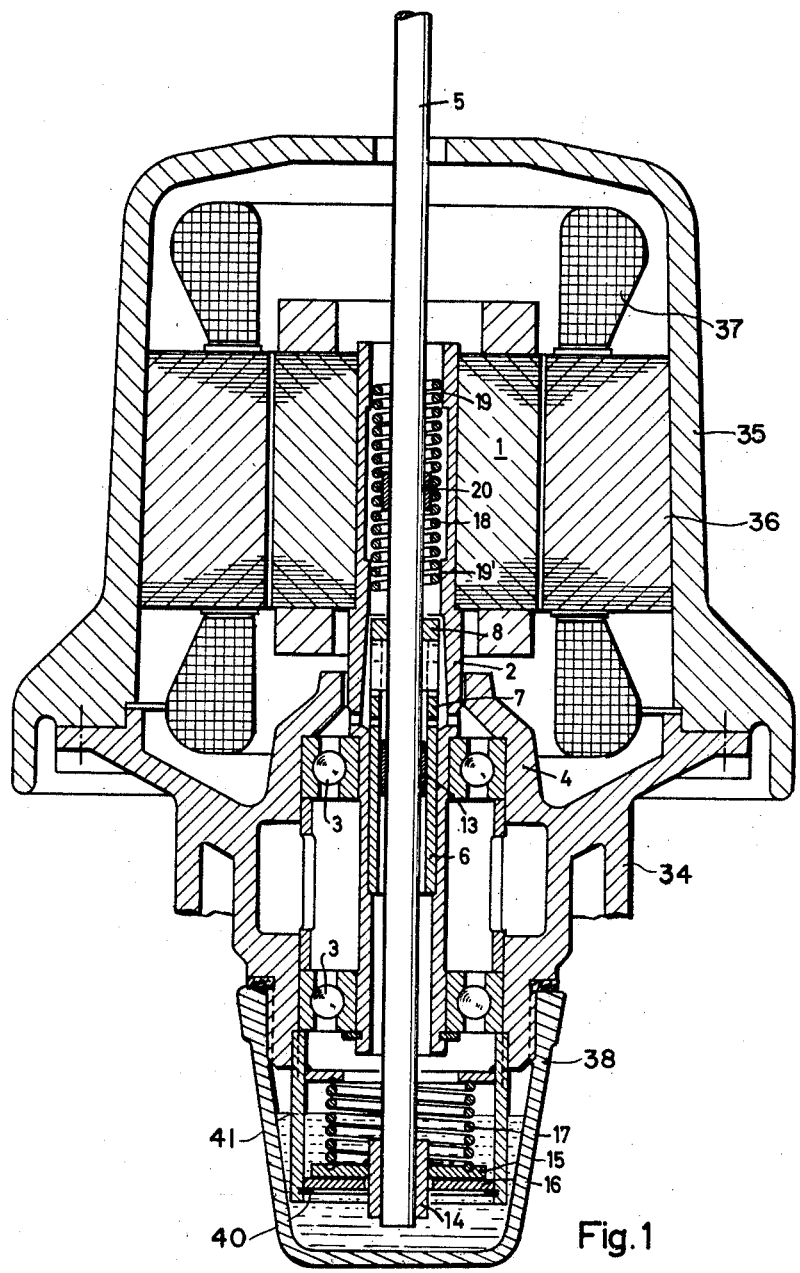
FIG. 1 is an axial section through a spinning-pot motor assembly.

The spinning-pot motor shown in FIG. 1 comprises a rotor 1 mounted on a hollow shaft 2 which is journelled by means of two roller bearings 3 mounted in a portion 4 of a shield structure 34 flanged to the housing 35 of the motor. Coaxially mounted in the housing are the stator 36 which like the rotor 1 is composed of iron laminations and carries the field windings 37. Coaxially attached and sealed to the shield structure 34 is a cup-shaped cover 38 partly filled with oil to serve as hydraulic damping liquid.

Figure 4:
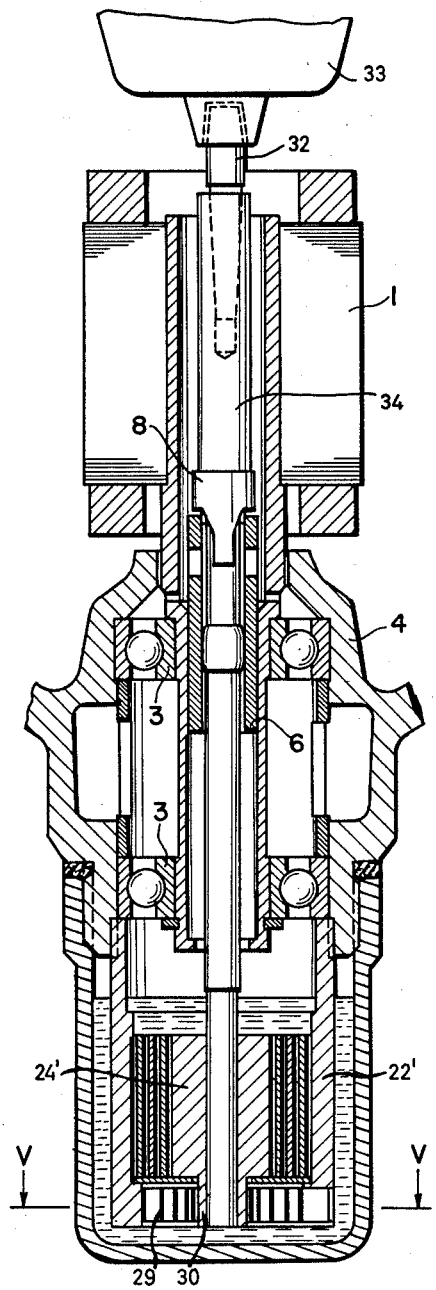
FIG. 4 is an axial section of another spinning-pot motor assembly.

The hollow shaft 2 of the rotor is traversed with clearance by a vertical inner shaft 5 which carries the spinning-pot (33 in FIG. 4). The inner shaft 5 is movable axially as well as radially or in angular relation to the hollow shaft 2. Such relative motion is afforded by means of a coupling composed of three parts 6, 7 and 8 (FIGS. 1, 2). Part 6 consists of a sleeve and is firmly seated in the hollow shaft 2. Part 8 is likewise sleeve-shaped but is rigidly seated on the inner shaft 5. The two sleeve parts 6 and 8 are provided with respective pairs of lugs 9 and 10 which are angularly displaced from each other. The part 7, likewise in form of a sleeve, is loosely seated on the inner shaft and has two pairs of recesses 11 and 12 which correspond to the respective lugs 9 and 10 and are in engagement therewith. The coupling, formed jointly by the parts 6, 7 and 8, positively transmits torque from the hollow shaft to the inner shaft but permits the inner shaft to perform the above-mentioned axial and angular displacements relative to the hollow shaft.

Mounted on the inner shaft at the height of the upper ball bearing 3 is a ring 13 which centers the inner shaft and simultaneously constitutes a pivot point about which the inner shaft can perform an angular motion. In lieu of the ring 13, the inner shaft may be provided with a bulge, or an annular groove or constriction may be provided in the hollow shaft 5 or the coupling part 6 to serve the same purpose.

The lower portion of the inner shaft 5 protrudes downwardly out of the hollow shaft 2 and carries a glide bearing 14 to which a friction disc 15 is fastened. The disc 15 is in frictional face-to-face engagement with a stationary friction disc 16, the frictional engagement being maintained by a helical compression spring 17. The parts 15, 16 and 17 constitute a frictional damping member which attenuates the oscillations transmitted from the spinning-pot to the inner shaft 5. The disc 16 is seated on a shoulder formed by an inserted spring ring 40 inserted into an annular groove of a cylindrical extension 41 coaxially joined with the shield member 34 by threaded engagement therewith.

Mounted on the inner shaft 2 at the height of the rotor 1 is a helical spring 18 which engages two axially spaced shoulders 19 and 19' of the hollow shaft 2 so that the spring can freely bend between these two shoulders. The inner shaft 5 carries a ring 20 which engages the inner side of the helical spring 18 and thus elastically centers the inner shaft relative to the hollow shaft.

The embodiment partially shown in FIG. 3 and corresponding in all other respects to the embodiment of FIGS. 1 and 2, differs therefrom with respect to a modification of the damping device. The device consists of a gap-type damper formed by several hollow cylinders nested in each other with clearance, or consisting of a wound-up spiral with clearance between the individual turns. The damping member is mounted within a housing 22 which is joined with the motor shield (34 in FIG. 1), and is submerged in a damping liquid, preferably oil, within a tank 23. The bearing 24 if the damping device is preferably so designed that a hollow space 27 remains between the two bearing locations, this space being in communication with the oil space through the glide bearings for shaft portions 25, 26 and also through a lateral bore 28. During axial displacement of the inner shaft 5, the oil volume in space 27 is varied, due to the fact that the lower bearing portion 26 of the inner shaft 5 has a smaller diameter than the upper portion 25. This change in volume results in a flow of damping liquid through the bearing locations 24, 26 and the relatively narrow bore 28, thus damping any axial oscillations. Consequently, this damping device performs the double function of damping peripheral as well as axial oscillations.

Figure 5:
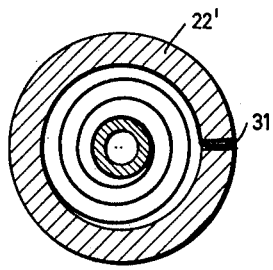
FIG. 5 is a cross section along the line V—V in FIG. 4.

In the embodiment of FIG. 4, the centering member does not consist of a spring as shown at 18 in FIG. 1, but is constituted by a spiral spring 29 provided between the downwardly extended housing 22' of the damping device and the likewise downwardly extended bearing 24' of the damping device. One end of the spring 29 is fastened to an extension 30 of the bearing 24'. The other end of spring 29 is clamped in a slot 31 of the housing 22' as shown in FIG. 5. In the embodiment of FIGS. 4 and 5, the inner shaft is composed of two portions. The upper shaft portion 32 carries the spinning-pot 33 and is clampingly inserted into the lower portion 34 of the inner shaft.

It will be apparent to those skilled in the art, upon studying this disclosure, that my invention permits of a variety of modifications with respect to the individual components of the assembly and hence may be given embodiments other than particularly illustrated and described herein, without departing from the essential features of my invention and within the scope of the claims annexed hereto.

I claim:

1. Electric spinning-pot motor comprising a vertical hollow rotor shaft, an inner shaft extending with radial clearance through said hollow shaft and having an upper portion protruding upwardly from said hollow shaft for supporting a spinning-pot, a torque-transmitting connection between said hollow shaft and said inner shaft for driving the latter, and universal pivot means on one of said shafts and engaging the other shaft, said pivot means being located near said torque-transmitting connection and defining substantially a center point about which said inner shaft is angularly deflectable in all directions relative to said hollow shaft, said inner shaft having a lower portion protruding downwardly from said hollow shaft, and oscillation damping means glidingly engaging said lower portion of said inner shaft, and resilient return means intermediate said shafts at a location above said pivot point for biasing said inner shaft toward the center of said hollow shaft.

2. Electric spinning-pot motor comprising a vertical hollow rotor shaft, an inner shaft extending with radial clearance through said hollow shaft and having an upper portion protruding upwardly from said hollow shaft for supporting a spinning-pot, a torque-transmitting connection between said hollow shaft and said inner shaft for driving the latter, and universal pivot means on one of said shafts and engaging the other shaft, said pivot means being located near said torque-transmitting connection and defining substantially a center point about which said inner shaft is angularly deflectable in all directions relative to said hollow shaft, said inner shaft having a lower portion protruding downwardly from said hollow shaft, and oscillation damping means glidingly engaging said lower portion of said inner shaft, and resilient return means intermediate said shafts at a location above said pivot point for biasing said inner shaft toward the center of said hollow shaft; said damping means having an inner-shaft engaging bearing member relative to which said inner shaft can rotate but which is radially movable by said inner shaft, a fixed member, and a damping system intermediate said members.

3. Electric spinning-pot motor comprising a vertical hollow rotor shaft, an inner shaft extending with radial clearance through said hollow shaft and having an upper portion protruding upwardly from said hollow shaft for supporting a spinning-pot, a torque-transmitting coupling device interconnecting said two shafts for positively driving said inner shaft from said hollow shaft, said inner shaft being axially and angularly displaceable relative to said hollow shaft, said inner shaft having a lower portion downwardly protruding from said hollow shaft, oscillation damping means connected with said lower portion of said inner shaft, and a motor structure fixed relative to said shafts, said hollow shaft having journal means fixed to said structure, and return-spring means disposed between said fixed structure and said inner shaft for elastically centering said inner shaft relative to said hollow shaft.

4. Electric spinning-pot motor comprising a vertical hollow rotor shaft, an inner shaft extending with radial clearance through said hollow shaft and having an upper portion protruding upwardly from said hollow shaft for supporting a spinning-pot, a torque-transmitting connection between said hollow shaft and said inner shaft for driving the latter, and universal pivot means on one of said shafts and engaging the other shaft, said pivot means being located near said torque-transmitting connection and defining substantially a center point about which said inner shaft is angularly deflectable in all directions relative to said hollow shaft, said inner shaft having a lower portion protruding downwardly from said hollow shaft, and oscillation damping means glidingly engaging said lower portion of said inner shaft.

5. In a spinning-pot motor according to claim 4, said pivot means comprising an annular bulge on said one shaft peripherally in gliding engagement with said other shaft, said inner shaft being axially displaceable relative to said hollow shaft due to said gliding engagement.

6. Electric spinning-pot motor comprising a vertical hollow rotor shaft, an inner shaft extending with radial clearance through said hollow shaft and having an upper portion protruding upwardly from said hollow shaft for supporting a spinning-pot, said inner shaft being in torque-transmitting connection with said hollow shaft to be driven thereby but being displaceable in non-peripheral directions relative to said hollow shaft, universal pivot means on one of said shafts and engaging the other shaft, said pivot means being located near said torque-transmitting connection and defining substantially a center point about which said inner shaft is angularly deflectable in all directions relative to said hollow shaft, said inner shaft having a lower portion protruding downwardly from said hollow shaft, return-spring means mounted between said inner shaft and said hollow shaft and engageable with both above said pivot point for elastically centering said inner shaft whereby said inner shaft tends to maintain a given coaxial position relative to said hollow shaft, and oscillation damping means glidingly engaging said lower portion of said inner shaft.

7. In a spinning-pot motor according to claim 6, said spring means comprising an axially elongated helical spring surrounding said inner shaft within said hollow shaft, said hollow shaft having two interior annular shoulders axially spaced from each other and engaged by the respective ends of said spring so as to form between said shoulders an annular space in which said spring may bend laterally, and said spring being in peripheral engagement with said inner shaft at a location about midway between said shoulders.

8. In a spinning-pot motor according to claim 4, said damping means comprising a friction device having a movable member fastened to said lower portion of said inner shaft and having a stationary member in frictional contact with said movable member.

9. In a spinning-pot motor according to claim 4, said damping means comprising a hydraulic damping device having a container with damping liquid, and having liquid-immersed damping structure mounted in subtsantially coaxial relation to said lower portion of said inner shaft and forming liquid-filled damping gaps around said lower portion.

10. In a spinning-pot motor according to claim 9, said damping device comprising a bearing member in which said lower portion of said inner shaft is journalled, said bearing member having a chamber disposed around said lower shaft portion and in hydraulic communication with said container, said lower shaft portion having in said cavity two axially sequential sections of respectively different diameters so that axial displacement of said inner shaft causes a volumetric change in said chamber, whereby said damping device dampens radial as well as axial displacements of said inner shaft.

References Cited in the file of this patent

UNITED STATES PATENTS

| | | |
|---|---|---|
| 1,472,588 | Doubler | Oct. 30, 1923 |
| 2,571,267 | Ljunggren | Oct. 16, 1951 |
| 2,772,546 | Barrows | Dec. 4, 1956 |

FOREIGN PATENTS

| | | |
|---|---|---|
| 949,719 | France | Feb. 28, 1949 |